July 11, 1961     H. J. FALK ET AL     2,991,708
COMBINED SPACE LIGHTING AND VENTILATING APPARATUS
Filed June 19, 1959     3 Sheets-Sheet 1

INVENTORS:
HARLY J. FALK
WILLARD GARNETT
LEO G. STAHLHUT

By Gravely, Lieder & Woodruff
ATTORNEYS.

INVENTORS:
HARRY J. FALK
WILLARD GARNETT
LEO G. STAHLHUT

By Gravely, Lieder & Woodruff
ATTORNEYS.

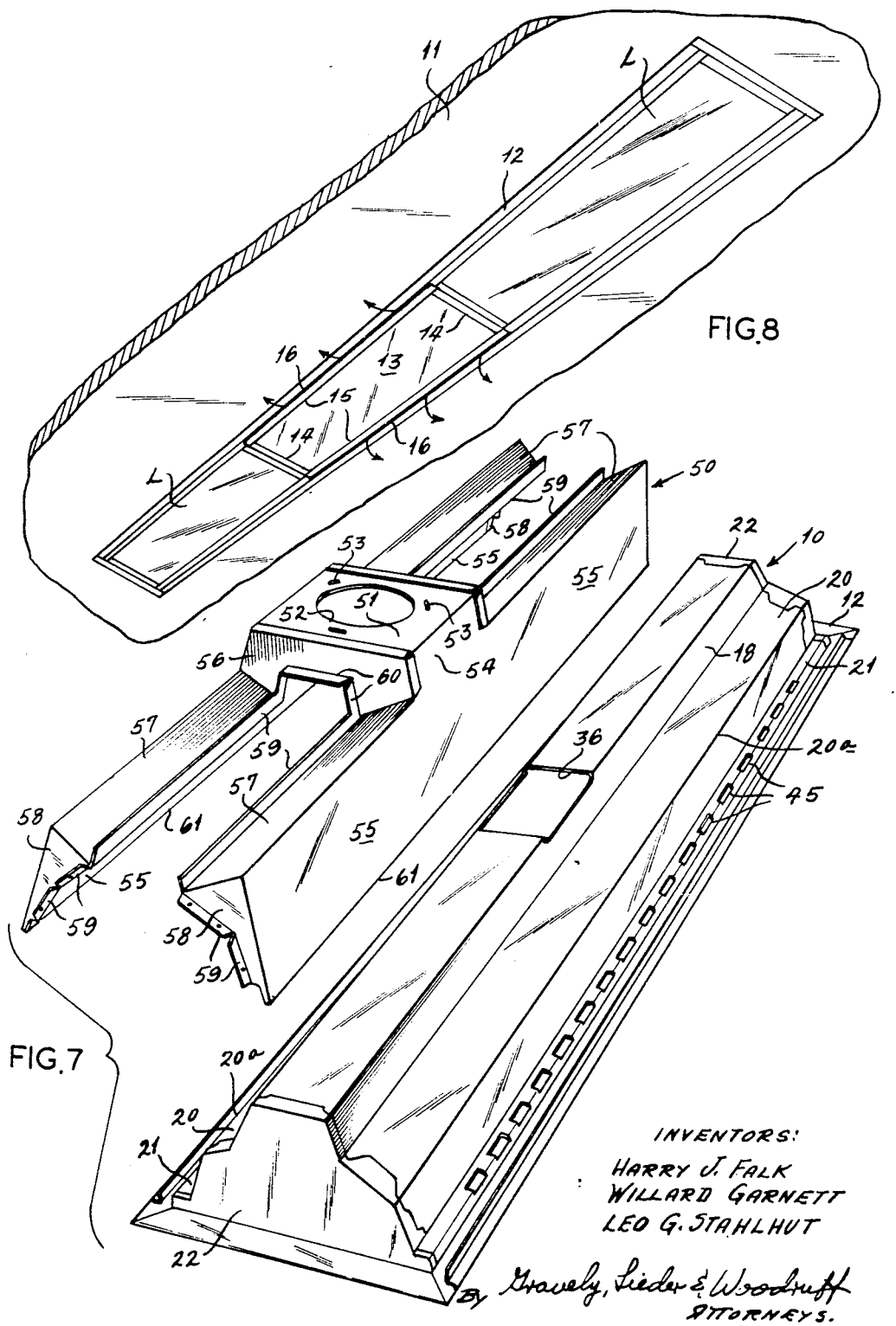

United States Patent Office 2,991,708
Patented July 11, 1961

2,991,708
COMBINED SPACE LIGHTING AND VENTILATING APPARATUS
Harry J. Falk and Willard Garnett, Bellefontaine Neighbors, and Leo G. Stahlhut, Kirkwood, Mo., assignors, by mesne assignments, to Day-Brite Lighting, Inc., St. Louis, Mo., a corporation of Missouri
Filed June 19, 1959, Ser. No. 821,476
4 Claims. (Cl. 98—40)

This invention pertains to improvements in space lighting and ventilating apparatus combined in a unique manner hereinafter to be described in relation to certain embodiments having preferred characteristics of construction and disposition of component parts.

The advantages of providing a common unit of which space lighting and ventilation are combined have been recognized heretofore and numerous attempts have been made to carry out the objectives. However, the prior attempts have fallen far short of being adequate for commercial use because of such drawbacks as poor appearance, expensive construction, too complicated construction, inadequate illumination for the sake of ventilation capacity, and overly complex problems for installation from a commercial standpoint.

Combined lighting and ventilating systems may be divided into a general type in which the lighting facility is separated from or independent of ventilating or air moving facility, and a general type in which the lighting and ventilating facilities are intermingled or in which the air movement takes place in the lighting facility. The disadvantage of the first type is poor appearance, excessive reduction in illumination area, and high cost of construction. The poor appearance is partly due to reduction in the lighting area in order to provide air orifices, and the need for dummy units, since fewer ventilation connections than lighting outlets are required which, in turn, increases first costs. The second type has the disadvantage of complicating the construction and raising costs, and of requiring the lighting fixture manufacturers to become involved in the air moving field which is not conducive to efficient operation and thoroughly mixes up the installation problems between the various trades.

The present invention has as an object the provision of combined lighting and ventilating apparatus which overcomes the disadvantages of both systems and results in a flexible arrangement of apparatus to satisfy the lighting level requirements and the capacity for ventilating a given space.

An object of this invention is to provide combined lighting and ventilating apparatus wherein the lighting component may be designed in accordance with illumination standards and practice, but which incorporates the necessary provisions for connection to ventilating components also designed in accordance with standard procedures, whereby the combination of the components produces an improved result in a more efficient manner as to both facilities and at a cost which will place the apparatus within the reach of a large number of users.

It is a further object of this invention to provide improved lighting and ventilating apparatus having a novel construction which allows the average workers in the electrical and air ventilating trades to carry out their normal individual functions, and yet does not impair the application of the skills of the manufacturers of the lighting and ventilating components to the design of a unitary device for the benefit of the users thereof.

Other objects will be pointed out or will appear in the following description of certain preferred embodiments of structure which will serve to illustrate the particular improvements which it is desired to define and claim. It is believed that the invention herein may be readily understood by those skilled in this art after considering the description of the structure disclosed in the accompanying drawings, wherein:

FIG. 7 is an exploded perspective view of a modified combination lighting and ventilating apparatus; the view being taken from the top;

FIG. 8 is a perspective view of a group of lighting fixtures disposed in a ceiling, with one of the fixtures constructed according to the principles of this invention.

Figures 1, 2, 9:
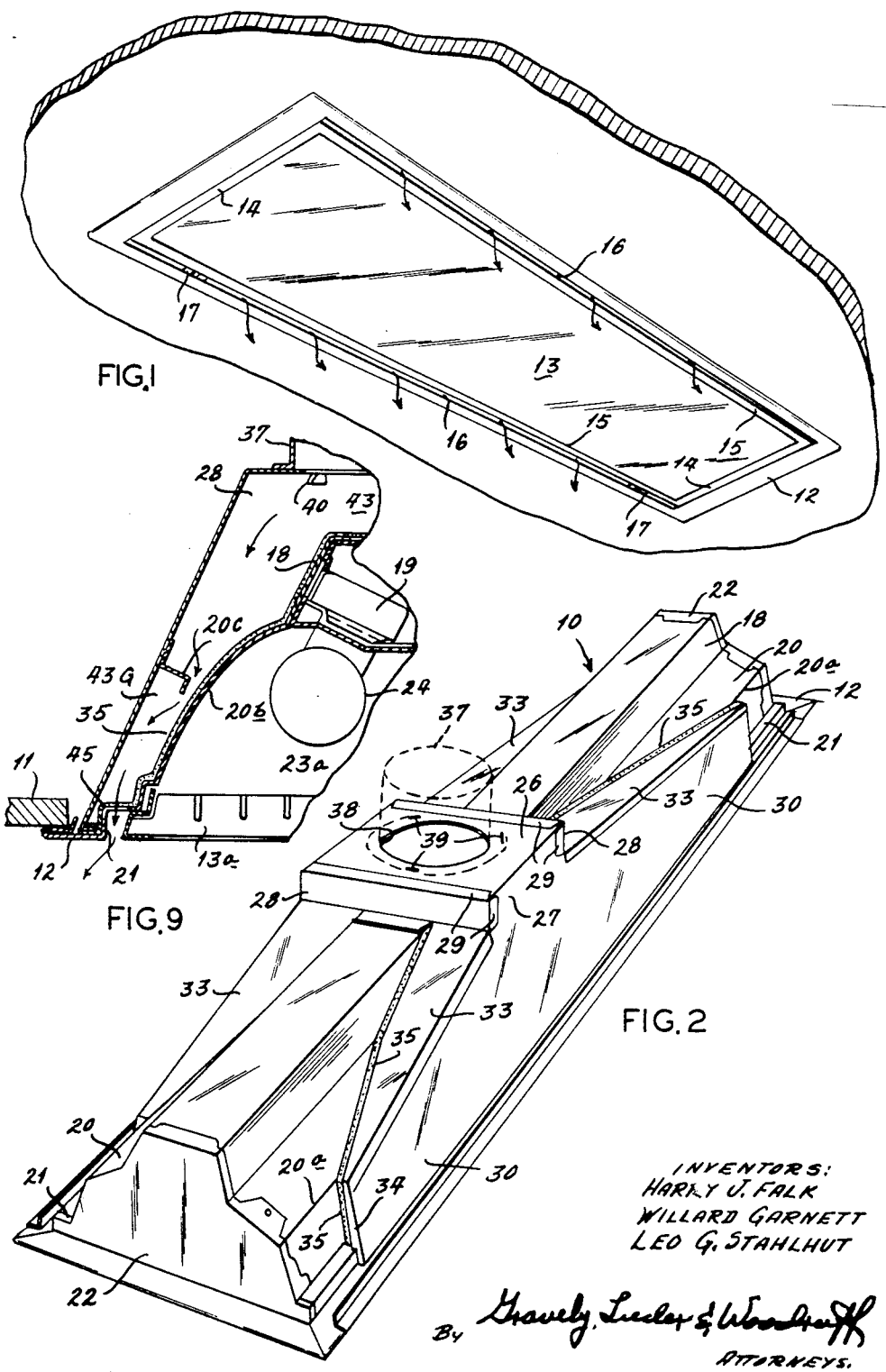
FIG. 1 is a perspective view, as seen from below, of a typical combined lighting and ventilating apparatus installed in the ceiling structure of a space to be illuminated and ventilated thereby.
FIG. 2 is a perspective view, as seen from above, of the apparatus shown in FIG. 1, and wherein structural features and characteristics are shown to advantage.
FIG. 9 is a fragmentary view similar to FIG. 5 but showing a modification in which a different configuration of lighting fixture may be substituted for the one shown in FIG. 5.

Referring to FIGS. 1 and 2, the improved apparatus 10 is suitably mounted in any usual manner in a false ceiling 11 with its face flange 12 flush with the plane of the ceiling. The flange 12 forms a frame for a rectangular opening in which light control means such as a suitable panel 13 is disposed, although light shielding louvers or similar means (FIG. 9) may be used in place of the panel. The panel 13 is supported in a frame structure having the end pieces 14 closely fitting with the face flange 12 and the longitudinal side pieces 15 spaced from the adjacent face flange 12 to provide elongated openings 16 at each side of the panel 13 for the movement of air between the room space below the false ceiling 11 and the space or plenum chamber P above the ceiling 11 (see FIG. 5) as is well understood in this art. The scale used in FIG. 5 has been exaggerated for the apparatus in relation to the vertical depth of the plenum chamber P for convenience of the drawing herein, it being normal to find the vertical depth of the apparatus of the order of six to eight inches and the plenum chamber P of the order of twelve inches or more, although a somewhat shallower plenum chamber may be encountered in some cases. The panel 13 is supported by its frame pieces 14 and 15 on hinge members 17 spaced along one of the side pieces 15 (FIG. 1), and releasable catches (not shown) retain the opposite side piece 15 in the body of the apparatus so that the panel may be hinged downwardly for relamping the apparatus, or for other purposes including installation.

Figure 3:
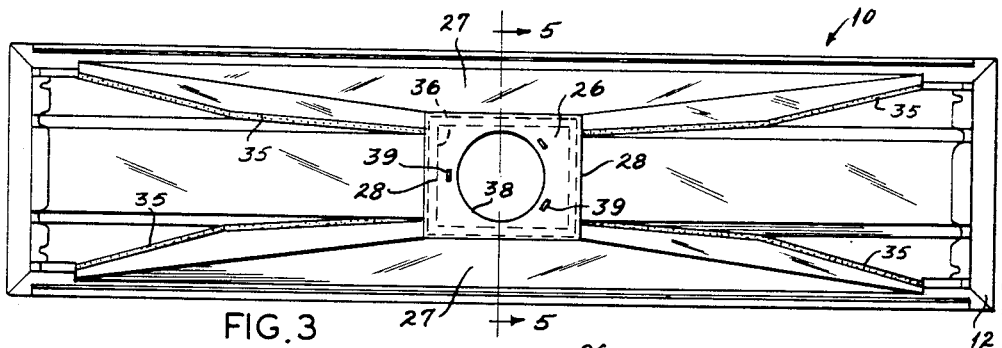
FIG. 3 is a top plan view of the assembly shown in FIG. 2.
Figure 4:
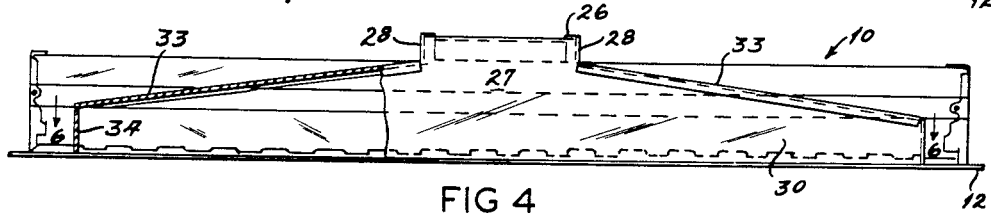
FIG. 4 is a side elevational view of the assembly shown in FIG. 3 with a portion of the air casing broken away.
Figure 5:
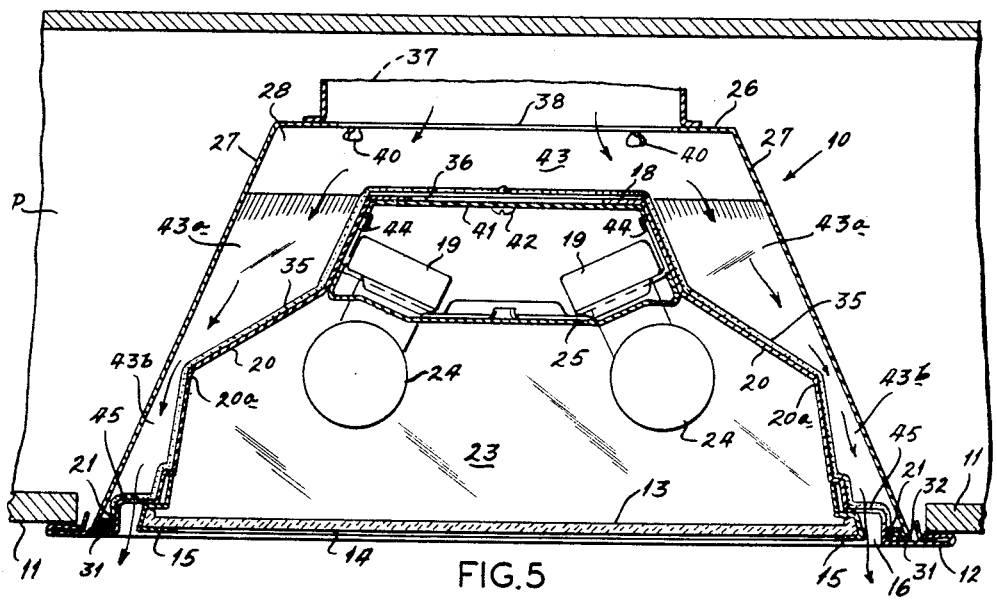
FIG. 5 is a transverse sectional elevational view taken at line 5—5 in FIG. 3 and drawn to an enlarged scale to illustrate the air casing structure.

In FIGS. 2, 3, 4 and 5 it may be seen that the apparatus 10 comprises an elongated troffer body having a wireway channel 18 extending along the top to receive the necessary and usual electrical components, wires, and to provide a space for the lamp sockets 19 (FIG. 5). Below the channel 18, the body is flared outwardly and downwardly at side walls 20, with the lower longitudinal margins offset at 21 adjacent the face flange 12 to provide a recess to receive the panel 13 and its frame 15. The panel frame 15 is spaced from the outer vertical walls of the recesses to define the air openings 16. Each end of the troffer body is closed by a cap 22 suitably secured by the overlapping flanges, thereby defining a space 23 for the lamp tubes 24. As seen in FIG. 5, the space 23 is divided from the upper wire-way channel 18 by a cover wall 25, and the inner surfaces of side walls 20 and cover 25 are made light reflective to direct the light downwardly through the panel 13 to the room space below.

The structure above described is well known in this art, having been shown in prior patents, namely, in United States Patent No. 2,683,799, issued on July 13, 1954, to George J. Taylor and Leo G. Stahlhut, and in United States Patent No. 2,647,985, issued August 4, 1953, to David J. Biller. However, such structure, while known per se, serves the useful functions and purposes now to be described in detail, and to the extent claimed hereinafter constitutes a part of the present invention.

As shown in FIG. 2, and in more detail in FIGS. 3, 4 and 5, the apparatus 10 is provided with an exteriorly disposed air directing casing consisting of a central air receiving box having an upper wall 26 spaced above the wire-way channel 18, depending side walls 27, and opposite end covers 28 secured in position by marginal flanges 29 which overlap walls 26 and 27 in sealed relation to prevent escape of air circulating in the box. Each side wall 27 is provided with oppositely extending wings 30 which are spaced from the troffer side walls 20 and extend downwardly to the rear surface of face flanges 12 and have inturned lips 31 (FIG. 5) which are sealed to the flanges 12 by a sealing strip 32. The wings 30 are closed at the top by cover walls 33, and at the opposite ends by closure walls 34. The cover walls 33 are sealed against the troffer walls 20 by suitable sealing strips 35, and these strips 35 continue along the inner margins of the end closures 34 so that the whole assembly of walls 27, 30, 33 and 34 forms an air casing spaced from the troffer walls 20 and sealed about its margins by strips 32 and 35.

The air casing may be separately constructed from the troffer body and applied thereto so that the provision for air circulation constitutes a structure which may be added to the lighting apparatus 10 when it is desired to incorporate in one unitary assembly provisions for illuminating and ventilating or air conditioning a common room space. The advantage of combining these two functions in a unitary assembly is, of course, seen in the great flexibility of construction and in the novel means whereby the separate skills of the air conditioning and lighting trades people may be utilized on the job without confusion and added expense to the users.

When making an installation with the apparatus herein described, the wire-way channel is provided with an access opening 36 (FIGS. 3 and 5) in its upper surface (similar to the opening shown in FIG. 7) to permit the workman to reach into the air box and make the necessary connections of an inlet header 37 at supply aperture 38 in the box wall 26. The wall 26 adjacent the aperture 38 is, in this example, formed with spaced slots 39 (FIG. 3) to receive securing ears 40 which when inserted may be given a twist (FIG. 5). The access opening is suitably closed by a cover plate 41 secured at opposite margins by threaded elements 42, one being shown in FIG. 5, so that the air passage 43 is maintained separated from the lamp space 23. A suitable damper or valve may be installed in header 37, as is well known, to adjust the air flow. This installation as well as damper adjustment is carried out with the wire-way cover panel 25 and plate 41 removed, but removal of panel 25 does not disturb the sockets 19, since these parts are carried by separate brackets 44 attached to the inner sides of the channel 18.

Figure 6:
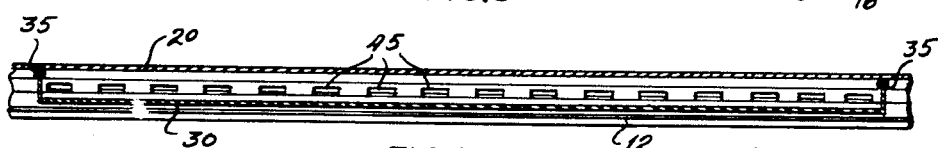
FIG. 6 is a fragmentary longitudinal sectional plan view of the air outlet means, the view being taken along line 6—6 in FIG. 4.

Since the air casing is securely sealed to the exterior of the lighting apparatus 10, air supplied at header 37 moves into the space 43 and moves down each side within walls 27 where it flows outwardly into the tapered wings at walls 30 along each side of the body, as shown in FIG. 5. Each longitudinal off-set marginal wall 21, as may be seen in FIGS. 5 and 6, within the length of walls 30, is formed with a series of apertures or slots 45 which open to the elongated slots 16 at each side of the panel frame pieces 15. It may be appreciated from FIG. 5 that the air supply at space 43 in the box at wall 26 and in the respective side spaces 43a has a relatively large volumetric area in which to distribute to the wings. However, before the air reaches the outlet slots 45 means is provided to impose a sufficient back pressure or resistance to obtain substantially even distribution at the apertures 45. The means consists in directing the side walls 27 and the lateral walls 30 downwardly at each side to pass close to the longitudinal bends or breaks 20a in the troffer side walls 20, thereby creating a restricted zone in the air passage along the lower portions of spaces 43a which creates the desired resistance to obtain distribution of air in the lengthwise direction of the apparatus. Having achieved the desired distribution in this simple manner, the air flow passes through the spaces 43b to the outlet slots 45. Since the slots 45 are located inwardly of the elongated openings 16, they are effectively shielded from direct view (FIG. 1) and do not detract from the appearance of the installation as would be the result if the slots were disposed in the face of the apparatus. Access to the slots 45 is easily obtained by removing the panel 13 so that cleaning is made easy.

Turning now to FIGS. 7 and 8, it may be seen that the apparatus 10 is shown with a modified air casing 50 in an exploded view, whereby details of the parts may be seen to advantage. The apparatus 10 is similar to that shown in FIG. 2 and like parts have been indicated by the same numerals of reference. The view of FIG. 8 illustrates the face appearance of lighting apparatus 10, when installed in a ceiling 11 in multiple with similar apparatus L not provided with air moving means but limited to the lighting function. However, the apparatus of FIG. 7 may be used in the manner indicated in FIG. 1.

In FIG. 7, the air casing 50 is suitably formed with a central box having a top wall 51 provided with an inlet aperture 52 and attachment slots 53 to receive the ears 40 of the supply header 37 shown in FIG. 5. Side walls 54 extend downwardly at each side of the top wall 51 and longitudinally extending walls 55 form wings directed in both directions therefrom. The top wall 51 is closed at its opposite ends by walls 56 which connect with upper closure walls 57 carried with the respective wing walls 55. The respective wing walls 55 and upper closure wall 57 end at the end walls 58. As is shown in FIG. 7, a series of attachment flanges 59 are formed on the respective walls of the air casing along the margins thereof which lie against the troffer walls 20, and flanges 60 on the end closure walls 56 lie against the walls of the wire-way 18. Though not shown, it is understood that the respective flanges 59 and 60 are sealed in position by strips 35, in the manner shown in FIG. 2. A sealing strip, such as is shown at 32 in FIG. 5, is also provided along the margins 61 of the wing walls 55 where these margins abut the face flange 12 on the body of the apparatus 10.

A central transverse sectional view through the assembly of parts 10 and 50 in FIG. 7 would produce the same view as that in FIG. 5. Therefore, it is not thought necessary to repeat such a view. The novel feature of the assembly is that the air supply and distribution spaces of large volume within the air casing 50 are located above the bend 20a in the troffer side walls 20, and the bend 20a forms a restricted longitudinal communication to the spaces just above the air outlet slots 45 in the off-set troffer wall 21. The relation of these spaces to the bend 20a is well illustrated in FIG. 5, and the desired degree of back pressure above bend 20a is achieved to cause the air flow to distribute lengthwise at the opposite sides of the assembly and flow substantially evenly toward the outlet slots 45. After the installation has been made of the head 37 over inlet aperture 36 in the supply box wall 51, the closure plate 41 (FIG. 5) may be installed at the access opening 36 in the manner above described.

The modified air casing 50 in FIG. 7 differs from the air casing of FIG. 2 or FIG. 9 in that the air distribution wings extending from the supply box in both directions longitudinally at the opposite sides of the troffer walls 20 are substantially rectilinear in form, thereby effecting a somewhat simpler component than would be the case, as in FIG. 3, where these wings are tapered in plan view. The advantage of having rectilinear walls is to care for a large volume of air flow as the enclosed spaces are greater in the respective end reaches of the casing wing walls. In either embodiment of the invention, the air movement is maintained between the outside surfaces of the troffer and the enclosing walls of the air casing so that no air is moved in or flows through the compartment for the lamps 24 which could reduce or affect the efficiency thereof.

In accordance with the foregoing description there is provided a combination illuminating and ventilating apparatus which, in either embodiment shown, includes an elongated troffer body 10 closed at the top wire-way channel 18 and having longitudinal side walls 20 flaring outwardly and downwardly to the open bottom bounded by flanges 12. The channel 18 is of lesser width than the open bottom, and the flaring walls are formed with a bend 20a intermediate its vertical span. The ventilating air flow casing carried in a pig-a-back fashion by the side walls of the troffer body includes principal walls 27 or 54 which have wing portions or lateral extensions running in opposite directions toward the ends of the troffer body, said principal walls being substantially flat and angularly directed to pass close to said bends 20a, but spaced farther from other areas of said flaring side walls above and below. An air box is seated transversely of the wire-way channel 18 to overhang at each side and open downwardly so that communication is established at each side with the spaces enclosed by the principal walls 27 or 54 and the other wall portions sealed against the exterior surfaces of the troffer body side walls 20. The air box has an upper wall, such as 26 or 51, with an aperture therein to communicate with a ventilating air connection 37, and the bottom of the air casing is constituted by downwardly facing walls 21 having slots 45 therein. In the embodiments shown the walls 21 are integral with the side walls 20 and are off-set to form recesses 16. The troffer body 10 and casing thereon cooperate to provide the necessary walls for the circulation of ventilating air between the room space below the ceiling 11 and the plenum P.

In FIG. 9 a variation of the assembly of FIG. 5 is shown, and the same consists in a troffer body having the wire-way channel 18 extending along the top and outwardly and downwardly directed side walls 20b (one being shown). This side wall 20b is curved instead of having the break 20a shown in FIG. 5, but a substantially straight wall is not unusual and the same is intended to be included. In other respects the assembly of FIG. 9 is substantially similar to that of FIGS. 2 and 5, except that the means 20a of FIG. 5 which acts to impose back pressure or resistance to air flow is now found in the provision of longitudinal means 20c carried by the side walls 27 and the lateral walls 30 of the air casing. Means 20c is a member which is spaced from the adjacent surface of wall 20b to form a restricted zone in the air passage between portions 43a and 43b. In this modification, light shielding means 13a is used in place of the panel 13, said shielding means comprising louvers extending across the light emitting opening. It is, of course, obvious that the means 13 and 13a may be used in any of the embodiments hereof. One form of shielding means is disclosed in said Taylor et al. Patent No. 2,683,799, and another form is disclosed in said Biller Patent No. 2,647,985.

In the above apparatus, if the plenum P is to be used for conducting ventilating air directly, then the connection 37 is not necessary. On the other hand, a conduit system installed in the plenum P will require the connection 37, but it is thought unnecessary to illustrate such arrangements since they do not constitute, per se, parts of the present invention. In the course of the description reference has been made to top and bottom parts, and horizontal and vertical directions, but these terms are not to be construed as imposing limitations which may not be otherwise necessary. The use of such terms of reference are intended to aid in understanding the description of the apparatus when installed in a ceiling opening of a room or other space. Furthermore, the presently improved apparatus may be installed in other than a flush position in a wall or ceiling opening, in which event the conduit means 37 may serve as the supporting column for the assembly and for ventilating air, the electrical service connection being made in a separate conduit extending along the conduit means 37.

The operation and manner of installing the present apparatus is believed to be easily understood from the foregoing description of the embodiments chosen for disclosure herein. An important feature hereof resides in the separate construction of the lighting apparatus and air casing so that a manufacturer of the lighting apparatus is not required to do more than provide the access opening 36 in the wire-way 18 and the air slots 45 in the longitudinal off-set walls 21.

Since the lighting apparatus has its own support in the flange 12 outside of the off-set walls 21, it is readily understood that air supply to the room may be direct from the plenum space P through slots or openings 45, and that suction applied in space P will act directly to remove air from the room and suffice as an exhaust unit. One example of this is shown in FIG. 7 in the fixture 10 by removing the air casing 50 and covering opening 36. The adoption of the air casing to fit the lighting apparatus provide better control of air movement and better results where different room areas and spaces are united in a common air exhaust or supply system. It is also apparent in an exhaust or a supply system, that the means 20a or 20c will act in the same general way for either direction of air flow, and the benefits of the structure are claimed herein. It is, therefore, within this invention to reverse the air flow direction.

In the usual case the dimensional data on the lighting apparatus will be readily available so that the fit of the air casing can be predetermined. Therefore, the objects and advantages of the invention are achieved in a novel manner with consequent savings in construction of the major components of the assembly, and a considerable lessening of the expense of installation and need for special skill and know how to effect such installation.

It is understood that changes and variations may come to mind after understanding the principles of this invention, and it is intended that all such changes and variations are to be included within the scope of the appended claims.

What is claimed is:

1. Apparatus for illuminating and ventilating a space, said apparatus being mounted in a wall of a space and including: an open bottom illuminating troffer body, illuminating lamps carried in said troffer body above the open bottom and said troffer body having a wire-way channel opposite said open bottom and depending side walls in spaced opposed relation and directed outwardly and downwardly, flange means on said side walls substantially in the plane of the wall of the space, said side walls being light reflective on the surfaces adjacent said lamps and said flange means having upwardly and inwardly offset portions relative to the plane of the wall of the space, air flow slots being formed in said inwardly offset flange portions; and an air flow casing including walls abutting said depending side walls and being secured upon the outer sides of said troffer body, said casing providing a passage outside the side walls of said troffer body and having the lower edge of certain of its walls extending into abutment with said flange means adjacent said upwardly offset flange portions in enclosing relation about said slots to form an air flow passage communicating with said slots, and an air flow aperture in said casing remote from said air flow slots, and said casing being of less length than said troffer body.

2. Apparatus for illuminating and ventilating a room space, said apparatus being mounted in a wall of the room space and comprising: an elongated open-bottom troffer body having a top wall opposite the open bottom and end walls and oppositely disposed side walls connected to said end walls and extending downwardly and angularly outwardly from said top wall, said side and end walls having marginal flanges located substantially in the plane of the open bottom and the flanges on said side walls having upwardly and inwardly offset portions forming a downwardly open longitudinally extending recess; illuminating lamps mounted in said troffer body and panel means connected to said troffer body in the open bottom thereof, the opposite longitudinal margins of said panel means being disposed in spaced relation from said upwardly extending portions of said side wall flanges to provide sides for said longitudinally extending recesses; and an air flow casing means carried upon the exterior of said troffer body along one side wall, said casing means including an outer wall spaced from said one troffer body side wall and extending downwardly into engagement with said one side wall flange adjacent the upwardly offset portion thereof, and other walls connected to said outer wall and being connected to the adjacent side wall of said troffer body to provide an air flow passage outside said troffer body, a lower portion thereof enclosing the upwardly and inwardly offset portions of said one side wall flange, said enclosed inwardly offset portion of said one side wall flange having air flow apertures opening to the longitudinal recess, and said casing having an air flow opening therein spaced from said apertures.

3. Combination illuminating and air flow apparatus for mounting in a wall of a room including: an open bottom troffer body defined by end walls, a top wall and side walls extending from the top wall downwardly and outwardly to the open bottom, each side wall having a stepped longitudinal margin formed by generally horizontal and vertical portions and said side and end walls having face flanges at the open bottom of said troffer body, said stepped longitudinal margins of each side wall having apertures therethrough opening to the room; illuminating lamps mounted within said troffer body below said top wall; casing means mounted on the exterior sides of said troffer body for directing the flow of air consisting of principal outer walls engaged at the lower margins upon said side wall face flanges, marginal walls on said outer walls extending to and secured upon troffer body side walls to form with said latter walls air flow passages and said outer walls and marginal walls extending into enclosing relation about said apertures in said stepped longitudinal margins and extending upwardly to adjacent said troffer body top wall; and an air flow box secured on said top wall and extending into connection with said outer walls and certain of said marginal walls to provide a passage opening to said casing means on the exterior sides of said troffer body, said box having an air flow aperture therein.

4. Combination illuminating and air flow apparatus for an enclosed space in which the apparatus is flush mounted in a wall of the space and comprises: a troffer body having a light reflecting interior space open to the space and defined by opposed spaced side walls and end walls and a top wall, said side and end walls having face flanges thereon adapted to fit flush with the wall of the space, and said side walls each having a stepped longitudinal margin at said face flange formed by a vertical portion and a horizontal portion, the horizontal portion having apertures therethrough facing to the room space, an elongated air flow casing secured upon each side wall and including a principal wall extending upwardly from a lower margin in abutment on said face flange to a position spaced from said top wall, other walls extending from other margins of said principal wall into engagement upon said side wall to form an air flow passage enclosing said apertures, said principal wall and other walls forming an opening adjacent said top wall and located intermediate the length of the casing; and an air flow box secured at said top wall and extending transversely thereof to connect with said opening in each air flow casing, said box having an aperture therein for air flow connection thereto.

References Cited in the file of this patent
UNITED STATES PATENTS

| | | |
|---|---|---|
| 1,406,055 | Merrell | Feb. 7, 1922 |
| 2,564,334 | Kennedy | Aug. 14, 1951 |
| 2,647,985 | Biller | Aug. 4, 1953 |
| 2,683,799 | Taylor et al. | July 13, 1954 |
| 2,845,855 | Burns | Aug. 5, 1958 |
| 2,960,602 | Kurth | Nov. 15, 1960 |